US012807799B2

(12) United States Patent
Muto et al.

(10) Patent No.: US 12,807,799 B2
(45) Date of Patent: Nov. 24, 2026

(54) RESIN COMPOSITION

(71) Applicant: Mitsubishi Chemical Corporation, Tokyo (JP)

(72) Inventors: Fumihiro Muto, Hiratsuka (JP); Shuta Iseki, Hiratsuka (JP)

(73) Assignee: Mitsubishi Chemical Corporation, Tokyo (JP)

(*) Notice: Subject to any disclaimer, the term of this patent is extended or adjusted under 35 U.S.C. 154(b) by 479 days.

(21) Appl. No.: 18/294,291

(22) PCT Filed: Jul. 27, 2022

(86) PCT No.: PCT/JP2022/028938

§ 371 (c)(1),
(2) Date: Feb. 1, 2024

(87) PCT Pub. No.: WO2023/013495

PCT Pub. Date: Feb. 9, 2023

(65) Prior Publication Data

US 2024/0343897 A1 Oct. 17, 2024

(30) Foreign Application Priority Data

| | | |
|---|---|---|
| Aug. 6, 2021 | (JP) | 2021-129720 |
| Nov. 18, 2021 | (JP) | 2021-187693 |
| Nov. 18, 2021 | (JP) | 2021-187694 |
| Feb. 3, 2022 | (JP) | 2022-015651 |
| Feb. 3, 2022 | (JP) | 2022-015652 |
| Feb. 3, 2022 | (JP) | 2022-015653 |

(51) Int. Cl.
*C08L 25/06* (2006.01)
*C08K 7/14* (2006.01)
*C08L 81/04* (2006.01)

(52) U.S. Cl.
CPC ................ *C08L 25/06* (2013.01); *C08K 7/14* (2013.01); *C08L 81/04* (2013.01); *C08L 2201/02* (2013.01); *C08L 2205/03* (2013.01)

(58) Field of Classification Search
CPC ...... C08L 25/06; C08L 81/04; C08L 2201/02; C08L 2205/03; C08L 81/02; C08K 7/14; C08G 75/02; C08G 75/0204; C08G 75/0209; C09D 181/02; C09J 181/02; C09J 5/04
See application file for complete search history.

(56) References Cited

FOREIGN PATENT DOCUMENTS

| | | | | |
|---|---|---|---|---|
| EP | 4 124 635 | A1 | | 2/2023 |
| JP | 50-156561 | A | | 12/1975 |
| JP | 5-39370 | A | | 2/1993 |
| JP | 2002-249661 | A | | 9/2002 |
| JP | 2004-83867 | A | | 3/2004 |
| JP | 2004168886 | A | * | 6/2004 |
| JP | 2004-269664 | A | | 9/2004 |
| JP | 2010-195399 | A | | 9/2010 |
| JP | 2014-141567 | A | | 8/2014 |
| JP | 2020-180192 | A | | 11/2020 |
| WO | WO-2006/090751 | A1 | | 8/2006 |

OTHER PUBLICATIONS

ASTM International, "ASTM D1238: Standard Test Method for Melt Flow Rates of Thermoplastics by Extrusion Plastometer," 2023, Version 23a, pp. 1-19. (Year: 2023).*
International Organization for Standardization, ISO 1133: Plastics—Determination of the melt mass-flow rate (MFR) and the melt volume-flow rate (MVR) of thermoplastics, 2005, fourth edition, pp. 1-22. (Year: 2005).*
International Search Report mailed on Sep. 27, 2022 in PCT/JP2022/028938 filed on Jul. 27, 2022 (3 pages).
Extended European Search Report issued Oct. 31, 2024, in corresponding European Patent Application No. 22852918.6, 7 pages.
Japanese Office Action issued Dec. 4, 2025 in Japanese Patent Application No. 2022-015653 (with English translation), 6 pages.
Japanese Office Action issued Dec. 4, 2025 in Japanese Patent Application No. 2022-015652 (with English translation), 7 pages.

* cited by examiner

*Primary Examiner* — Robert S Jones, Jr.
*Assistant Examiner* — Joshua Caleb Bledsoe
(74) *Attorney, Agent, or Firm* — Oblon, McClelland, Maier & Neustadt, L.L.P.

(57) ABSTRACT

A resin composition may exhibit excellent low warpage and heat resistance, and may include, based on a total of 100 parts by mass of (A) to (C): (A) 25 to 48 parts by mass of a polyphenylene +-sulfide resin having an MVR, measured at 295° C. under a 1.00 kgf load, of 60 to 500 $cm^3$/10 min; (B) an amorphous rubber-reinforced polystyrene or polystyrene having an MVR, measured at 200° C. under a 5 kgf load, of 0.3 to 16 $cm^3$/10 min and/or (C) a polyphenylene ether resin, a total content of (B) and (C) being 52 to 75 parts by mass; and (D) 5 to 150 parts by mass of a fibrous filler.

11 Claims, 1 Drawing Sheet

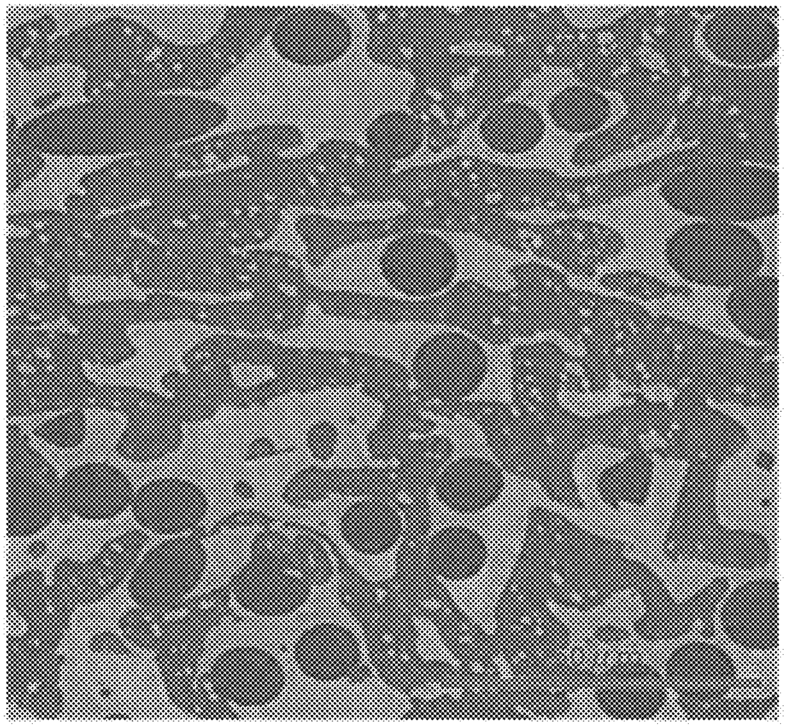

RESIN COMPOSITION

CROSS-REFERENCE TO RELATED APPLICATIONS

The present application is the national stage of international application PCT/JP2022/028938, filed on Jul. 27, 2022, and claims the benefit of the filing date of Japanese Appl. No. 2021-129720, filed on Aug. 6, 2021, Japanese Appl. No. 2021-187693, filed on Nov. 18, 2021, Japanese Appl. No. 2021-187694, filed on Nov. 18, 2021, Japanese Appl. No. 2022-015651, filed on Feb. 3, 2022, Japanese Appl. No. 2022-015652, filed on Feb. 3, 2022, and Japanese Appl. No. 2022-015653, filed on Feb. 3, 2022.

TECHNICAL FIELD

The present invention relates to a resin composition, and more specifically relates to a resin composition which contains a polyphenylene sulfide resin and exhibits excellent heat resistance and exhibits enhanced low warpage.

BACKGROUND ART

Polyphenylene sulfide resin (hereinafter abbreviated to PPS resin) exhibits excellent heat resistance, chemical resistance, electrical insulating properties, and so on, and is therefore widely used in electrical/electronic equipment components, motor vehicle components, other electrical equipment components, mechanical components, and the like.

However, PPS resin is crystalline resin, and therefore has high a mold shrinkage factor and tends to suffer from problems in terms of warping of molded articles. Lamellar filler such as talc have been blended in order to ameliorate warping of PPS resin, but strength and toughness tend to deteriorate.

In addition, techniques for reducing warpage by alloying PPS resin with polyphenylene ether resin (hereinafter abbreviated to PPE resin) has been proposed (for example, see PTL 1), but it has not yet been possible to achieve enhanced low warpage to an extent required for large molded articles.

CITATION LIST

Patent Literature

[PTL 1] JP 2004-269664 A

SUMMARY OF INVENTION

Technical Problem

The purpose of (problem to be addressed by) the present invention is to provide a resin composition which contains a PPS resin and which exhibits excellent heat resistance and exhibits enhanced low warpage to an extent required for large molded articles.

Solution to Problem

As a result of diligent research carried out in order to solve the problem mentioned above, the inventors of the present invention have found that the problem mentioned above could be solved by combining a high flow PPS resin with a large quantity of an amorphous polystyrene or rubber-reinforced polystyrene having a high molecular weight and a low MVR and/or an amorphous PPE resin and also blending a fibrous filler, and thereby completed the present invention.

The present invention relates to the following resin composition and molded article.

1. A resin composition comprising, based on a total of 100 parts by mass of (A) to (C) below, 25 to 48 parts by mass of a polyphenylene sulfide resin (A) having an MVR, as measured at 295° C. under a 1.00 kgf load, of 60 to 500 $cm^3$/10 min, an amorphous rubber-reinforced polystyrene or polystyrene (B) having an MVR, as measured at 200° C. under a 5 kgf load, of 0.3 to 16 $cm^3$/10 min and/or a polyphenylene ether resin (C), a total content of the (B) and the (C) being 52 to 75 parts by mass, and 5 to 150 parts by mass of a fibrous filler (D).

2. The resin composition of 1 above, which comprises both of the (B) and the (C) and in which the total content thereof is 52 to 75 parts by mass based on a total of 100 parts by mass of the (A) to (C).

3. The resin composition of 1 above, wherein the mass ratio (B)/(C) of content values of the (B) and the (C) is 0.1 or more.

4. The resin composition of 1 above, wherein a mass ratio (B)/(C) of content values of the (B) and the (C) is 0.5 or more.

5. The resin composition of 1 above, further comprising 1 to 20 parts by mass of a brominated flame retardant (E) based on a total of 100 parts by mass of (A) to (C).

6. The resin composition of 1 above, further comprising 0.1 to 5 parts by mass of an epoxy compound (F) based on a total of 100 parts by mass of (A) to (C), wherein the epoxy equivalent weight of the epoxy group-containing compound (F) is 150 to 1500 g/eq.

7. The resin composition of 1 above, wherein an intrinsic viscosity of the polyphenylene ether resin (C), as measured at 30° C. in chloroform, is 0.4 dl/g or more.

8. The resin composition of 1 above, wherein the polyphenylene sulfide resin (A) is a linear polyphenylene sulfide resin.

9. The resin composition of 1 above, wherein the fibrous filler (D) is surrounded by the polyphenylene sulfide resin (A).

10. A molded article comprising the resin composition of any one of 1 to 9 above.

11. The molded article of 10 above, which is a in-vehicle housing component.

Advantageous Effects of Invention

The resin composition of the present invention is particularly excellent in terms of low warpage and also exhibits excellent heat resistance.

BRIEF DESCRIPTION OF DRAWINGS

FIG. 1 A photograph of an SEM image showing the morphology of a resin composition obtained in an example.

DESCRIPTION OF EMBODIMENTS

The resin composition of the present invention comprises, based on a total of 100 parts by mass of (A) to (C) below, 25 to 48 parts by mass of a polyphenylene sulfide resin (A) having an MVR, as measured at 295° C. under a 1.00 kgf load, of 60 to 500 $cm^3$/10 min, an amorphous rubber-reinforced polystyrene or polystyrene (B) having an MVR, as measured at 200° C. under a 5 kgf load, of 0.3 to 16 $cm^3$/10 min and/or a polyphenylene ether resin (C), a total content of the (B) and the (C) being 52 to 75 parts by mass, and 5 to 150 parts by mass of a fibrous filler (D).

By constituting in such a way, despite being a system in which the content of the PPS resin (A) is low and the content of the rubber-reinforced polystyrene or polystyrene (B) and/or the PPE resin (C) is high, the high flow PPS resin (A) forms a sea (matrix) in a sea-island structure or a sea in a co-continuous structure, and the rubber-reinforced polystyrene or polystyrene (B) and/or the PPE resin (C), which have a low melt viscosity, form islands, and the PPS resin (A) becomes continuous via the fibrous filler (D) and tends to form a matrix (sea), meaning that it is possible to obtain a resin composition which is particularly excellent in terms of low warpage and also exhibits excellent heat resistance.

Embodiments of the present invention will now be explained in detail. Explanations given below are based on embodiments and specific examples, but it should be understood that the present invention is not limited to such embodiments or specific examples.

Moreover, use of the symbol "–" in the present specification means that numerical values mentioned before and after the "–" include the lower limit and upper limit thereof.

[Polyphenylene Sulfide Resin (A)]

The resin composition of the present invention contains a polyphenylene sulfide resin (A) having an MVR, as measured at 295° C. under a 1.00 kgf load, of 60 to 500 $cm^3$/10 min.

By combining a high flow PPS resin having an MVR of 60 to 500 $cm^3$/10 min with a rubber-reinforced polystyrene or polystyrene (B) and a polyphenylene ether resin (C), it is possible to obtain a resin composition which exhibits low warpage to a high extent, excellent heat resistance, and excellent mechanical strength and chemical resistance.

If a pps resin having an MVR of less than 60 $cm^3$/10 min is used, the warpage amount increases, low warpage is difficult to achieve, the high heat resistance of the PPS resin is not exhibited, and mechanical strength tends to be low. In addition if a pps resin having an MVR of more than 500 $cm^3$/10 min is used, it is difficult to form the sea-island structure described above, the rubber-reinforced polystyrene or polystyrene (B) and polyphenylene ether resin (C) tend to form a sea, and low warpage and heat resistance tend to deteriorate. The MVR is preferably 70 $cm^3$/10 min or more, more preferably 75 $cm^3$/10 min or more, further preferably 80 $cm^3$/10 min or more, and especially preferably 85 $cm^3$/10 min or more, and is preferably 300 $cm^3$/10 min or less, and more preferably 250 $cm^3$/10 min or less.

Moreover, the MVR of the PPS resin (A) in the present invention is a value measured at a temperature of 295° C. under a 1.00 kgf load.

The PPS resin (A) contains a p-phenylene sulfide unit as a constituent unit, and the content of the p-phenylene sulfide unit is preferably more than 50 mol %, more preferably 70 mol % or more, and further preferably 90 mol % or more. Examples of other constituent units include m-phenylene sulfide units, o-phenylene sulfide units, phenylene sulfone units, phenylene ketone units, phenylene ether units and substituent group-containing phenylene sulfide units.

Of these, poly(p-phenylene sulfide) in which the content of p-phenylene sulfide units is preferably 70 mol % or more, further preferably 90 mol % or more, and which particularly preferably contains only p-phenylene sulfide units, is preferred from the perspective of obtaining a resin composition having excellent strength, toughness, heat resistance, chemical resistance and mechanical characteristics.

The method for producing the PPS resin (A) is not particularly limited, and may be produced using a method that is known as a commonly used method for producing PPS resin. Specifically, the PPS resin is obtained by subjecting paradichlorobenzene and sodium sulfate to a polycondensation reaction in a polar solvent, the reaction progresses at a high temperature and pressure, polymerization is effected by means of a dehydration reaction or a desalting reaction, and the MVR can be adjusted by adjusting the polymerization time or the amount of catalyst or by introducing a branching agent.

The PPS resin (A) may be a leaner-type resin in which a leaner molecular structure is maintained by not carrying out a special heat treatment or a crosslinked resin obtained by treating the resin at a high temperature in the presence of oxygen, but is preferably a leaner PPS resin rather than a crosslinked resin from the perspective of sufficiently achieving the advantageous effect of the present invention.

[Rubber-Reinforced Polystyrene or Polystyrene (B)]

The resin composition of the present invention contains a rubber-reinforced polystyrene or a polystyrene, and an amorphous rubber-reinforced polystyrene or polystyrene (B) having an MVR, as measured at 200° C. under a 5 kgf load, of 0.3 to 16 $cm^3$/10 min is used.

The rubber-reinforced polystyrene or polystyrene (B) is preferably amorphous. Here, the term amorphous means that when a sample is measured using a differential scanning calorimeter (DSC) or the like, no clear melting point or melting peak is detected. Conversely, the term crystalline means that a crystal structure in which molecules are arranged in an ordered manner tends to be formed, and a melting point and a melting peak are present in measurements carried out using a differential scanning calorimeter (DSC) or the like. Syndiotactic polystyrene or the like, in which benzene rings are alternately arranged in an ordered manner on a polymer main chain, is crystalline and is preferably excluded as the rubber-reinforced polystyrene or polystyrene (B).

The polystyrene may be a homopolymer of styrene or a copolymer obtained by copolymerizing another aromatic vinyl monomer, such as α-methylstyrene, paramethylstyrene, vinyltoluene or vinylxylene, at a quantity of, for example, 50 mass % or less.

The rubber-reinforced polystyrene is preferably obtained by copolymerizing or blending a butadiene rubber component, and the amount of the butadiene rubber component is generally not less than 1 mass % and less than 50 mass %, preferably 3 to 40 mass %, more preferably 5 to 30 mass %, and further preferably 5 to 20 mass %. It is particularly preferable for the rubber-reinforced polystyrene to be a high impact polystyrene (HIPS).

In the present invention, a substance having an MVR, as measured at 200° C. under a 5 kgf load, of 0.3 to 16 $cm^3$/10 min is used as the rubber-reinforced polystyrene or polystyrene (B). By containing the rubber-reinforced polystyrene or polystyrene (B) having such an MVR at a quantity such that the total content of the rubber-reinforced polystyrene or polystyrene (B) and/or the PPE resin (C) is 52 to 75 parts by mass based on a total of 100 parts by mass of (A) to (C), with the content of the PPS resin (A) being 25 to 48 parts by mass, the PPS resin (A) is dominant in terms of physical properties, and it is therefore possible to achieve high heat resistance and low warpage to a high degree. If the MVR is 16 $cm^3$/10 min or less, heat resistance and chemical resistance can be improved, and if the MVR is 0.3 $cm^3$/10 min or more, excellent production stability and fluidity can be achieved.

The MVR of the rubber-reinforced polystyrene or polystyrene (B) is preferably 0.4 $cm^3$/10 min or more, more preferably 0.8 $cm^3$/10 min or more, further preferably 1.0 $cm^3$/10 min or more, and especially preferably 1.1 $cm^3$/10 min or more. In addition, the upper limit of the MVR is preferably 11 $cm^3$/10 min or less, more preferably 8 $cm^3$/10 min or less, further preferably 6 $cm^3$/10 min or less, and particularly preferably 4 $cm^3$/10 min or less.

[Polyphenylene Ether Resin (C)]

The polyphenylene ether resin (C) used in the resin composition of the present invention is a polymer having a constituent unit represented by the general formula shown below in the main chain of the resin, and may be a homopolymer or a copolymer.

[C1]

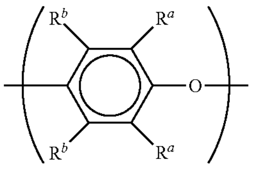

(In the formula, the two $R^a$ moieties each independently denote hydrogen atom, halogen atom, primary or secondary alkyl group, aryl group, aminoalkyl group, haloalkyl group, hydrocarbon-oxy group or halohydrocarbon-oxy group, and the two $R^b$ moieties each independently denote hydrogen atom, halogen atom, primary or secondary alkyl group, aryl group, haloalkyl group, hydrocarbon-oxy group or halohydrocarbon-oxy group. However, the two $R^a$ moieties may not both be hydrogen atoms.)

$R^a$ and $R^b$ are preferably hydrogen atom, primary or secondary alkyl group or aryl group. Preferred examples of primary alkyl group include methyl group, ethyl group, n-propyl group, n-butyl group, n-amyl group, isoamyl group, 2-methylbutyl group, 2,3-dimethylbutyl group, 2-, 3- or 4-methylpentyl group and heptyl group. Preferred examples of secondary alkyl group include isopropyl group, sec-butyl group and 1-ethylpropyl group. It is particularly preferable for $R^a$ to be a primary or secondary alkyl group having 1 to 4 carbon atoms or phenyl group. $R^b$ is preferably hydrogen atom.

Preferred examples of homopolymer of the PPE resin (C) include 2,6-dialkylphenylene ether polymers such as poly(2,6-dimethyl-1,4-phenylene ether), poly(2,6-diethyl-1,4-phenylene ether), poly(2,6-dipropyl-1,4-phenylene ether), poly(2-ethyl-6-methyl-1,4-phenylene ether) and poly(2-methyl-6-propyl-1,4-phenylene ether). Examples of copolymer include 2,6-dialkylphenol/2,3,6-trialkylphenol copolymers such as 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer, graft copolymers obtained by graft polymerizing styrene onto poly(2,6-dimethyl-1,4-phenylene ether), and graft copolymers obtained by graft polymerizing styrene onto 2,6-dimethylphenol/2,3,6-trimethylphenol copolymer.

It is particularly preferable for the PPE resin (C) to be poly(2,6-dimethyl-1,4-phenylene ether) or a 2,6-dimethylphenol/2,3,6-trimethylphenol random copolymer.

The PPE resin (C) preferably has an intrinsic viscosity, as measured at 30° C. in chloroform, of 0.4 dl/g or more, and more preferably 0.42 dl/g or more. If the intrinsic viscosity is 0.4 dl/g or more, the mechanical strength of the resin composition is further improved, and the resin composition tends to exhibit chemical resistance and heat resistance. The upper limit of the intrinsic viscosity is preferably 0.8 dl/g, and if the intrinsic viscosity is 0.8 dl/g or less, fluidity is further improved and molding processing tends to be easier. In addition, it is possible to attain an intrinsic viscosity within this range by using two or more types of PPE resin having different intrinsic viscosity values.

The method for producing the PPE resin (C) is not particularly limited, and it is possible to use a well-known method, such as a method comprising subjecting a monomer such as 2,6-dimethylphenol to oxidative polymerization in the presence of an amine copper catalyst, and in such a case, it is possible to control the intrinsic viscosity within the desired range through selection of reaction conditions. The intrinsic viscosity can be controlled by selecting conditions such as polymerization temperature, polymerization time and catalyst quantity.

By incorporating the PPE resin (C) and/or the rubber-reinforced polystyrene or polystyrene (B) having the MVR mentioned above in the resin composition of the present invention at a quantity of 52 to 75 parts by mass based on a total of 100 parts by mass of (A) to (C), in combination with 25 to 48 parts by mass of the PPS resin (A), the PPS resin (A) is dominant in terms of physical properties, and it is therefore possible to achieve high heat resistance and low warpage to a high degree.

Preferred content values of (A) to (C) are, based on a total of 100 parts by mass of (A) to (C), 30 to 48 parts by mass, and especially 35 to 48 parts by mass, of component (A), and 52 to 70 parts by mass, and especially 52 to 65 parts by mass, of component (B) and/or component (C).

It is preferable to incorporate both the rubber-reinforced polystyrene or polystyrene (B) and the PPE resin (C), and based on a total of 100 parts by mass of (A) to (C), the total content of (B) and (C) is preferably 52 to 75 parts by mass, the content of (B) is preferably 20 to 60 parts by mass, and the content of (C) is preferably 15 to 40 parts by mass.

In addition, the mass ratio of the content values of (B) and (C) [(B)/(C)] is preferably 0.1 or more from the perspective of deflection temperature under load, and is more preferably 0.3 or more, and especially 0.4 or more, 0.5 or more, 0.7 or more, or 0.8 or more. In addition, from the perspective of improving moldability, the mass ratio of the content values of (B) and (C) [(B)/(C)] is preferably 15 or less, more preferably 10 or less, and especially 8 or less, 6 or less, 5 or less or 4 or less, and is particularly preferably 2 or less.

[Fibrous Filler (D)]

The resin composition of the present invention contains a fibrous filler (D).

Examples of the fibrous filler (D) include fibrous fillers such as glass fiber, carbon fiber and mineral fiber, but of these, glass fiber is preferred.

Regardless of the form of glass fiber at the time of blending, such as chopped strand, roving glass or a master batch of a thermoplastic resin and glass fiber, any type of well-known glass fiber can be used as glass fiber, such as A-glass, E-glass, and zirconia component-containing alkali-resistant glass composition. Of these, the glass fiber is preferably an alkali-free glass (E-glass) from the perspective of improving the thermal stability of the resin composition.

Glass fiber in which a cross section in the length direction is round or in which the irregular shape aspect ratio in a cross section in the length direction is 2 to 6 are preferred as glass fiber. The irregular shape aspect ratio in a cross section in the length direction assumes a rectangle of the smallest area circumscribed by a cross section perpendicular to the length direction of a glass fiber, and is the major diameter/minor diameter ratio, where the length of the long side of this rectangle is taken to be the major diameter and the length of the short side of the rectangle is taken to be the minor diameter. By incorporating glass fiber having an irregular shape aspect ratio of 2 to 6, the glass fiber exhibits a bridging function between oriented phases of the PPS resin (A), the PPS resin (A) readily forms a matrix (sea), and it is therefore possible to specifically improve heat resistance and achieve low warpage and excellent appearance.

Furthermore, in a case where these glass fibers are surrounded by phases of the PPS resin (A), the crosslinking effect between PPS resin (A) phases achieved by the glass fibers is further increased, and bulky glass fibers also have the function of a bulking agent for the PPS resin (A), and it is therefore easy to further increase heat resistance.

In the case of glass fiber having an irregularly shaped cross section, the irregular shape aspect ratio is more preferably 2.5 or more, and further preferably 3 or more, and is more preferably 5.5 or less, and further preferably 5 or less. It is particularly preferable for the shape of the cross section in the length direction to be substantially rectangular.

The cross sectional area in the length direction of the glass fiber is preferably more than 180 $\mu m^2$ and not more than 300 $\mu m^2$, and by having such a cross sectional area, the PPS resin (A) readily forms a matrix, and heat resistance therefore tends to be improved. The cross sectional area is more preferably more than 180 $\mu m^2$ and not more than 250 $\mu m^2$, and further preferably more than 180 $\mu m^2$ and not more than 200 $\mu m^2$.

The thickness of the glass fiber is not particularly limited, but it is preferable for the minor diameter to be 2 to 20 μm and the major diameter to be approximately 5 to 50 μm.

The glass fiber may be treated with a sizing agent or a surface treatment agent. In addition to untreated glass fiber, it is possible to surface treat glass fiber through addition of a sizing agent or a surface treatment agent when producing the resin composition of the present invention.

Examples of sizing agents include emulsions of resins such as vinyl acetate resin, ethylene/vinyl acetate copolymer, acrylic resin, epoxy resin, polyurethane resin and polyester resin.

Examples of surface treatment agents, aminosilane compounds such as γ-aminopropyltriethoxysilane, γ-aminopropyltrimethoxysilane and γ-(2-aminoethyl)aminopropyltrimethoxysilane, chlorosilane compounds such as vinyltrichlorosilane and methylvinyldichlorosilane, alkoxysilane compounds such as vinyltrimethoxysilane, vinyltriethoxysilane, vinyltriacetoxysilane and γ-methacryloxypropyltrimethoxysilane, epoxysilane compounds such as β-(3,4-epoxycyclohexyl)ethyltrimethoxysilane and γ-glycidoxypropyltrimethoxysilane, acrylic compound, isocyanate compound, titanate compound and epoxy compound.

It is possible to use a combination of two or more of these sizing agents and surface treatment agents, and the usage quantity (coating weight) thereof is generally 10 mass % or less, and preferably 0.05 to 5 mass %, relative to the mass of the glass fibers. Setting this coating weight to be 10 mass % or less achieves a necessary and satisfactory effect.

Two or more types of the fibrous filler (D) may be used in combination according to required characteristics, and the content thereof is, relative to a total of 100 parts by mass of the PPS resin (A), the rubber-reinforced polystyrene or polystyrene (B) and the PPE resin (C), 5 to 150 parts by mass, and is preferably 10 parts by mass or more, more preferably 20 parts by mass or more, further preferably 30 parts by mass or more, and particularly preferably 40 parts by mass or more, and is preferably 120 parts by mass or less, more preferably 100 parts by mass or less, especially preferably 80 parts by mass or less, and particularly preferably 60 parts by mass or less. By incorporating the fibrous filler at such a quantity, it is possible to achieve a high degree of heat resistance, increase the strength of an obtained molded body and enhance a shrinkage reduction effect.

In the resin composition of the present invention, it is preferable for the fibrous filler (D) to be surrounded by phases of the PPS resin (A) in a cross sectional structure of a molded body of the resin composition, as observed using an electron microscope. In addition, it is preferable for the PPS resin (A) to form a sea (matrix) and the rubber-reinforced polystyrene or polystyrene (B) and the PPE resin (C) to form a co-continuous phase in a sea-island structure. By having structure with this type of morphology, a product in which heat resistance in particular is further improved, low warpage is excellent and appearance is also excellent tends to be formed.

FIG. 1 is a photograph of an SEM image showing the morphology of a molded article of a resin composition obtained in Example 2. In the diagram, it is understood that the light gray parts are co-continuous phases comprising polystyrene and the PPE resin, dark gray parts form matrix phases (sea phases) of the PPS resin, black circles are glass fibers, and glass fibers are surrounded by phases of the PPS resin.

The resin composition of the present invention may contain another lamellar, granular or amorphous inorganic filler in addition to the fibrous filler (D). Examples of inorganic lamellar fillers include talc, glass flake, mica, kaolin, expanded graphite, flaky graphite and metal foil.

Examples of other types of granular and amorphous inorganic fillers include ceramic bead, clay, zeolite, barium sulfate, titanium oxide, silicon oxide, aluminum oxide, magnesium hydroxide and zinc sulfide.

These inorganic fillers other than the fibrous filler (D) have the function of reducing warping by reducing anisotropy, but also cause a decrease in the strength and toughness of the resin composition, and it is therefore preferable not to add an excessive amount of these other inorganic fillers.

When contained in the resin composition, the content of these other inorganic fillers is, relative to a total of 100 parts by mass of the PPS resin (A), the rubber-reinforced polystyrene or polystyrene (B) and the PPE resin (C), preferably 30 parts by mass or less, more preferably 20 parts by mass or less, further preferably 15 parts by mass or less, especially preferably 10 parts by mass or less or 7 parts by mass or less, and particularly preferably 5 parts by mass or less.

[Brominated Flame Retardant (E)]

The resin composition of the present invention preferably contains a brominated flame retardant (E) in order to improve flame retardancy. In addition, incorporating the brominated flame retardant (E) achieves the advantageous effect of significantly reducing corrosion of metals.

A variety of compounds can be used as the brominated flame retardant (E). Examples of brominated flame retardants include brominated phthalimide, brominated polyacrylate, brominated epoxy compound, brominated polycarbonate and brominated polystyrene, but of these, brominated phthalimide, brominated polyacrylate and brominated epoxy compound are preferred from the perspective of further improving flame retardancy without significantly impairing the heat resistance of the resin composition of the present invention.

A compound represented by general formula (1) below is preferred as a brominated phthalimide.

[C2]

(1)

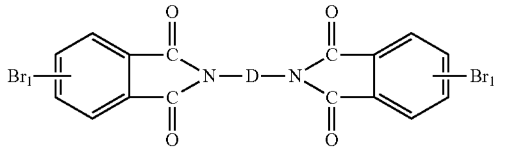

In formula (1), D denotes alkylene group, alkyl ether group, diphenyl sulfone group, diphenyl ketone group or diphenyl ether group. i is an integer between 1 and 4.

Examples of the brominated phthalimide represented by general formula (1) above include N,N'-(bistetrabromophthalimide)ethane, N,N'-(bistetrabromophthalimide)propane, N,N'-(bistetrabromophthalimide)butane, N,N'-(bistetrabromophthalimide)diethyl ether, N,N'-(bistetrabromophthalimide)dipropyl ether, N,N'-(bistetrabromophthalimide)dibutyl ether, N,N'-(bistetrabromophthalimide)diphenyl sulfone, N,N'-(bistetrabromophthalimide)diphenyl ketone and N,N'-(bistetrabromophthalimide)diphenyl ether.

A brominated phthalimide in which D in general formula (1) above is alkylene group is preferred as the brominated phthalimide, and brominated phthalimide represented by general formula (2) is particularly preferred.

[C3]

(3)

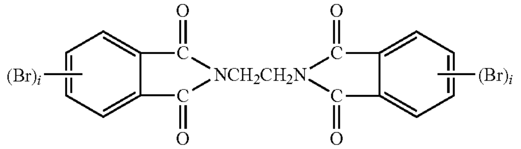

In formula (2), i is an integer between 1 and 4.

Of these, N,N'-ethylene bis(tetrabromophthalimide), in which i in formula (2) above is 4, is preferred.

In the brominated phthalimide, the bromine concentration is preferably 52 to 75 mass %, more preferably 56 to 73 mass %, and further preferably 57 to 70 mass %. By setting the bromine concentration to fall within such a range, good flame retardancy can be easily maintained.

The brominated polyacrylate is preferably a polymer obtained by polymerizing a bromine atom-containing benzyl (meth)acrylate alone, or copolymerizing two or more such monomers, or copolymerizing such a monomer with another vinyl monomer. The bromine atom is attached to a benzene ring, and the number of bromine atoms attached is preferably 1 to 5, preferably 4 to 5 per benzene ring.

Examples of bromine atom-containing benzyl acrylates include pentabromobenzyl polyacrylate, tetrabromobenzyl polyacrylate, tribromobenzyl polyacrylate and mixtures of these. In addition, examples of bromine atom-containing benzyl methacrylates include methacrylates corresponding to the acrylates mentioned above.

Specific examples of other vinyl monomers used for copolymerization with the bromine atom-containing benzyl (meth)acrylate include acrylic acid; acrylic acid esters such as methyl acrylate, ethyl acrylate, butyl acrylate and benzyl acrylate; methacrylic acid; methacrylic acid esters such as methyl methacrylate, ethyl methacrylate, butyl methacrylate and benzyl methacrylate; styrene, acrylonitrile, unsaturated carboxylic acids, such as fumaric acid and maleic acid, and anhydrides thereof; vinyl acetate and vinyl chloride.

These are generally used at an equimolar quantity or less relative to the bromine atom-containing benzyl (meth)acrylate, and preferably at a quantity corresponding to 0.5 times or less of this equimolar quantity.

In addition, xylene diacrylate, xylene dimethacrylate, tetrabromoxylene diacrylate, tetrabromoxylene dimethacrylate, butadiene, isoprene, divinylbenzene, and the like, can be used as the vinyl monomer, and these can generally be used at a quantity corresponding to 0.5 times or less of the equimolar quantity relative to the bromine atom-containing benzyl acrylate or benzyl methacrylate.

The brominated polyacrylate is preferably a polymer obtained by polymerizing a bromine atom-containing acrylate monomer, and especially benzyl (meth)acrylate, alone, or copolymerizing two or more such monomers, or copolymerizing such a monomer with another vinyl monomer, bromine atoms are added to a benzene ring. The bromine atom is added to the benzene ring, and the number of bromine atoms added is preferably 1 to 5, more preferably 4 to 5 per benzene ring.

Pentabromobenzyl polyacrylate is preferred as the brominated polyacrylate due to having a high bromine content, exhibiting excellent thermal stability and having high electrical insulation properties (tracking resistance properties).

Specific preferred examples of brominated epoxy compounds include brominated bisphenol A epoxy compounds such as tetrabromobisphenol A epoxy compound and glycidyl brominated bisphenol A epoxy compound.

The molecular weight of the brominated epoxy compound is arbitrary and should be selected and decided as appropriate, but the mass average molecular weight (Mw) thereof is preferably 3,000 to 100,000, and especially a high molecular weight within this range, and more specifically, the Mw value is preferably 10,000 to 80,000, and especially 13,000 to 78,000, more preferably 15,000 to 75,000, and particularly preferably 18,000 to 70,000, and a high molecular weight within this range is preferred.

The brominated epoxy compound preferably has an epoxy equivalent weight of 3,000 to 40,000 g/eq, more preferably 4,000 to 35,000 g/eq, and particularly preferably 10,000 to 30,000 g/eq.

The brominated flame retardant (E) preferably has a thermal decomposition initiation temperature of 350° C. or higher, more preferably 360° C. or higher, and especially 365° C. or higher, 370° C. or higher, 380° C. or higher, 390° C. or higher, 395° C. or higher, or 400° C. or higher. By incorporating a brominated flame retardant (E) having this type of high thermal decomposition initiation temperature, it is easy to impart flame retardancy without causing a deterioration in production stability at the time of pellet production or a deterioration in gas discharge properties at the time of molding.

The content of the brominated flame retardant (E) is preferably 1 to 20 parts by mass relative to a total of 100 parts by mass of the PPS resin (A), the rubber-reinforced polystyrene or polystyrene (B) and the PPE resin (C).

If the content of the brominated flame retardant (E) is less than 1 part by mass, flame retardancy tends to be insufficient, and if this content exceeds 20 parts by mass, mechanical strength such as impact resistance tends to be insufficient and the specific gravity tends to be too high. The content of the brominated flame retardant (E) is preferably 2 parts by mass or more, more preferably 3 parts by mass or more, especially preferably 4 parts by mass or more, and particularly preferably 5 parts by mass or more, and is preferably 17 parts by mass or less, more preferably 15 parts by mass or less, especially preferably 12 parts by mass or less, yet more preferably 10 parts by mass or less, and particularly preferably 9 parts by mass or less.

[Antimony Trioxide]

The resin composition of the present invention preferably contains antimony trioxide in order to further improve flame retardancy. Examples of antimony compounds include antimony trioxide ($Sb_2O_3$), antimony pentoxide ($Sb_2O_5$) and sodium antimonate, but of these, antimony trioxide is preferred.

Antimony trioxide is preferably blended at a quantity such that the total mass ratio of bromine atoms derived from the brominated flame retardant (E) in the resin composition and antimony atoms in the antimony trioxide is 3 to 25 mass %, more preferably 4 to 22 mass %, and further preferably 10 to 20 mass %. If this total mass ratio by mass is less than 3 mass %, flame retardancy tends to deteriorate, and if this total mass ratio by mass exceeds 25 mass %, mechanical strength tends to deteriorate. In addition, the mass ratio of bromine atoms to antimony atoms (Br/Sb) is preferably 0.3 to 5, and more preferably 0.3 to 4. Setting this mass ratio to fall within such a range is preferred because flame retardancy can be readily achieved.

The antimony trioxide is preferably used in the form of a master batch prepared in advance, and is preferably blended as a master batch with a thermoplastic resin, and preferably the rubber-reinforced polystyrene or polystyrene (B) or the polyphenylene ether resin (C). Due to this configuration, the antimony trioxide tends to be present in phases of the rubber-reinforced polystyrene or polystyrene (B) or the polyphenylene ether resin (C), thermal stability during melt kneading and molding is improved, a deterioration in impact resistance is suppressed, and variations in flame retardancy and impact resistance tend to be reduced.

It is preferable for the content of antimony trioxide in the master batch to be 20 to 90 mass %. In cases where the content of the antimony trioxide is less than 20 mass %, the proportion of the antimony compound in the flame retardant master batch is low and the flame retardancy improvement effect tends to be low. Meanwhile, in cases where the content of the antimony trioxide exceeds 90 mass %, dispersibility of the antimony trioxide tends to deteriorate, the flame retardancy of the resin composition becomes unstable when the antimony trioxide is blended, and workability tends to deteriorate when a master batch is produced, for example, when a master batch is produced using an extruder, strands are not stable and problems such as snapping readily occur, which is not desirable.

It is preferable for the content of antimony trioxide in the master batch to be 30 to 85 mass %.

The content of antimony trioxide is, relative to a total of 100 parts by mass of the PPS resin (A), the rubber-reinforced polystyrene or polystyrene (B) and the PPE resin (C), preferably 0.1 to 10 parts by mass, more preferably 0.5 parts by mass or more, further preferably 1 part by mass or more, especially preferably 1.5 parts by mass or more, and particularly preferably 2 parts by mass or more, and is more preferably 8 parts by mass or less, further preferably 6 parts by mass or less, especially preferably 5 parts by mass or less, and particularly preferably 4 parts by mass or less. If this content is lower than the lower limit mentioned above, flame retardancy tends to decrease, and if this content is higher than the upper limit mentioned above, the crystallization temperature decreases, mold release properties deteriorate, and mechanical properties such as impact resistance tend to deteriorate.

[Epoxy Compound (F)]

It is preferable for the resin composition of the present invention to contain an epoxy compound (F).

The PPS resin (A) per se does not have a chemical structure that reacts with the epoxy compound (F), but by incorporating the epoxy compound (F), the epoxy compound (F) is unevenly distributed towards a boundary between the PPS resin (A) and the fibrous filler (D) due to polar affinity, thereby increasing interfacial strength between the PPS resin (A) and the fibrous filler (D) and enabling an improvement in mechanical strength, and toughness in particular, of the resin composition.

In cases where the epoxy compound (F) is contained, a preferred content thereof is 0.1 to 5 parts by mass relative to a total of 100 parts by mass of the PPS resin (A), the rubber-reinforced polystyrene or polystyrene (B) and the PPE resin (C). By specifying this type of content, it is possible to improve mechanical strength, and toughness in particular. If this content is less than 0.1 parts by mass, the improvement effect described above is reduced, and if this content exceeds 5 parts by mass, significant thickening occurs when the resin composition is left to stand, and moldability tends to decrease. The content of the epoxy compound (F) is more preferably 0.2 parts by mass or more, and particularly preferably 0.3 parts by mass or more, and is more preferably 4 parts by mass or less, further preferably 3 parts by mass or less, especially preferably 2 parts by mass or less or 1.5 parts by mass or less, and particularly preferably 1 part by mass or less.

The epoxy compound (F) may be a compound having one or more epoxy groups per molecule, and examples thereof include novolac epoxy compound, bisphenol A epoxy compound, bisphenol F epoxy compound, alicyclic epoxy compound, glycidyl ether compound, glycidyl ester compound, epoxidized butadiene polymer and resorcin epoxy compound.

Moreover brominated epoxy compounds given as examples of the brominated flame retardant (E) are excluded as this epoxy compound (F). In addition, epoxy group-containing elastomers given as examples of elastomers below are also excluded as this epoxy compound (F).

Examples of novolac epoxy compounds include phenol novolac epoxy compound and cresol novolac epoxy compound.

Examples of bisphenol A epoxy compounds include bisphenol A diglycidyl ether and hydrogenated bisphenol A diglycidyl ether, and examples of bisphenol F epoxy compounds include bisphenol F diglycidyl ether and hydrogenated bisphenol F diglycidyl ether.

Examples of alicyclic epoxy compounds include vinylcyclohexene oxide, dicyclopentadiene oxide, 3,4-epoxycyclohexyl-3,4-cyclohexyl carboxylate, bis(3,4-epoxycyclohexylmethyl) adipate, vinylcyclohexene diepoxide and 3,4-epoxycyclohexyl glycidyl ether.

Examples of glycidyl ether compounds include monoglycidyl ether compounds such as methyl glycidyl ether, butyl glycidyl ether, 2-ethylhexyl glycidyl ether, decyl glycidyl ether, stearyl glycidyl ether, phenyl glycidyl ether, butylphenyl glycidyl ether and allyl glycidyl ether; and diglycidyl ether compounds such as neopentyl glycol diglycidyl ether, ethylene glycol diglycidyl ether, glycerin diglycidyl ether, propylene glycol diglycidyl ether and bisphenol A diglycidyl ether.

Examples of glycidyl ester compounds include monoglycidyl ester compounds such as glycidyl benzoic acid esters and glycidyl sorbic acid esters; and diglycidyl ester compounds such as diglycidyl adipic acid esters, diglycidyl terephthalic acid esters, diglycidyl orthophthalic acid esters.

Examples of epoxidized butadiene polymers include epoxidized polybutadiene, epoxidized styrene-butadiene copolymer and epoxidized hydrogenated styrene-butadiene copolymer.

Examples of resorcin epoxy compounds include resorcin diglycidyl ether.

In addition, the epoxy compound (F) may be a copolymer comprising a glycidyl group-containing compound as one component. Examples thereof include copolymer of glycidyl ester of α,β-unsaturated acid and one or two or more monomers selected from the group consisting of α-olefin, acrylic acid, acrylic acid ester, methacrylic acid and methacrylic acid ester, and epoxy group-containing acrylic (co) polymer can be given as preferred examples.

For example, epoxy group-containing olefinic elastomers and the like, which are commonly used epoxy compound, are flexible, and therefore exhibit excellent toughness, but are insufficient in terms of a mechanical strength improvement effect and are also inferior in terms of rigidity, and are therefore not particularly preferred.

The epoxy compound (F) preferably has an epoxy equivalent weight of 150 to 1500 g/eq. If the epoxy equivalent weight is less than 150 g/eq, the viscosity of the resin composition tends to increase because the amount of epoxy groups is too high, but if the epoxy equivalent weight exceeds 1500 g/eq, the amount of epoxy groups is few, meaning that it tends to be difficult to adequately achieve the effect of improving the mechanical strength of the resin composition. The epoxy equivalent weight is preferably 150 to 1000 g/eq, and more preferably 150 to 500 g/eq.

The weight average molecular weight of the epoxy compound (F) is preferably 300 to 9000. If this weight average molecular weight exceeds 9000, compatibility between the PPS resin (A), the rubber-reinforced polystyrene or polystyrene (B) and the PPE resin (C) decreases, and the mechanical strength of a molded body of the resin composition tends to decrease. This weight average molecular weight is more preferably 7000 or less, and further preferably 6000 or less.

The weight average molecular weight of the epoxy compound (F) is a weight average molecular weight Mw calculated in terms of polystyrene using GPC.

A bisphenol A epoxy compound or novolac epoxy compound obtained by reacting epichlorohydrin with bisphenol A or novolac, or an epoxy group-containing acrylic (co) polymer is particularly preferred as the epoxy compound (F) from the perspectives of heat resistance and handleability.

[Elastomer]

The resin composition of the present invention may contain an elastomer from the perspectives of improving the toughness of the resin composition and achieving heat shock resistance. From the perspective of compatibility with the PPS resin (A), the elastomer is preferably an epoxy group-containing olefinic elastomer or an epoxy group-containing acrylic elastomer.

Epoxy group-containing olefinic elastomer or acrylic elastomer is preferably elastomer obtained by introducing a glycidyl group into an olefinic elastomer or an acrylic elastomer. The method for introducing glycidyl group is not limited, and any well-known method can be used. Specific examples thereof include a method comprising copolymerizing epoxy group-containing vinyl monomer such as glycidyl ester compound of α,β-unsaturated acid, such as glycidyl acrylate, glycidyl methacrylate, glycidyl ethacrylate or glycidyl itaconate, with an olefinic or acrylic monomer as an elastomer raw material, a method comprising polymerizing an elastomer polymer using an epoxy group-containing polymerization initiator or chain transfer agent, and a method comprising grafting an epoxy compound onto an elastomer.

The content of glycidyl groups is generally 1 to 20 mass %, and is preferably 3 to 15 mass %, more preferably 3 to 12 mass %, and particularly preferably 4 to 8 mass %, in the case of glycidyl methacrylate groups.

Preferred examples of olefinic elastomers include diene-containing elastomers such as polybutadiene, polyisoprene, styrene-butadiene random copolymer and block copolymer, hydrogenated product of these block copolymers, and butadiene-isoprene copolymer, ethylene-propylene random copolymer and block copolymer, ethylene-butene random copolymer and block copolymer, copolymer of ethylene and α-olefin, ethylene-propylene-non-conjugated diene terpolymer such as ethylene-propylene-hexadiene copolymer, and butylene-isoprene copolymer.

Acrylate elastomer is rubbery elastomer obtained by polymerizing acrylic acid ester or copolymerizing acrylic acid ester as a primary component, examples of which include rubbery polymer obtained by graft polymerizing a graft-polymerizable monomer such as methyl methacrylate onto a polymer obtained by polymerizing an acrylic acid ester such as butyl acrylate and a small quantity of a crosslinkable monomer such as butylene diacrylate.

Examples of said acrylic acid ester include methyl acrylate, ethyl acrylate, propyl acrylate, hexyl acrylate and 2-ethylhexyl acrylate in addition to butyl acrylate. In addition, examples of the crosslinkable monomer include esters of a polyol and acrylic acid or methacrylic acid, such as butylene dimethacrylate and trimethylolpropane trimethacrylate, vinyl compounds such as vinyl acrylate and vinyl methacrylate, allyl acrylate, allyl methacrylate, diallyl maleate, diallyl fumarate, diallyl itaconate, monoallyl maleate and monoallyl fumarate in addition to butylene diacrylate.

In addition, examples of the graft-polymerizable monomer mentioned above include methacrylic acid esters, such as ethyl methacrylate, butyl methacrylate, hexyl methacrylate, 2-ethylhexyl methacrylate and lauryl methacrylate, styrene and acrylonitrile in addition to methyl methacrylate. Furthermore, examples of glycidyl group-containing acrylates include glycidyl methacrylate. Some of this graft-polymerizable monomer can be copolymerized by being present when a polymer is produced by polymerizing an acrylic acid ester and a crosslinkable monomer mentioned above.

A copolymer obtained by combining an olefinic monomer mentioned above and an acrylate monomer mentioned above is preferred as the olefinic elastomer or acrylic elastomer.

The epoxy group-containing olefinic elastomer or epoxy group-containing acrylic elastomer is preferably obtained by copolymerizing glycidyl methacrylate, and it is particularly preferable for the content of constituent units derived from glycidyl methacrylate to be 3 to 15 mass %.

[Stabilizer]

It is preferable for the resin composition of the present invention to contain a stabilizer from the perspectives of improving thermal stability and preventing a deterioration in mechanical strength, transparency and color tone. Phosphorus-containing stabilizer, sulfur-containing stabilizer and phenolic stabilizer, which are thermal stabilizer and antioxidant, are preferred as the stabilizer.

Examples of phosphorus-containing stabilizers include phosphorus acid, phosphoric acid, phosphorus acid ester (phosphite), trivalent phosphoric acid ester (phosphonite) and pentavalent phosphoric acid ester (phosphate), and of these, organic phosphite compound, organic phosphonite compound and organic phosphate compound are preferred.

A preferred organic phosphate compound is a compound represented by the general formula below:

$$(R^1O)_{3-n}P(=O)OH_n$$

In the formula, $R^1$ denotes an alkyl group or an aryl group, and multiple $R^1$ groups may be the same as, or different from, each other. n denotes an integer of 0 to 2.

A more preferred example of an organic phosphate compound is a long chain alkyl acid phosphate compound in which $R^1$ has 8 to 30 carbon atoms. Specific examples of alkyl groups having 8 to 30 carbon atoms include octyl group, 2-ethylhexyl group, isooctyl group, nonyl group, isononyl group, decyl group, isodecyl group, dodecyl group, tridecyl group, isotridecyl group, tetradecyl group, hexadecyl group, octadecyl group, eicosyl group and triacontyl group.

Examples of long chain alkyl acid phosphate compounds include octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphates, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate and bis (nonylphenyl) acid phosphate. Of these, octadecyl acid phosphate is preferred, and this compound is commercially available as the product "Adekastab AX-71" produced by ADEKA.

A preferred organic phosphite compound is a compound represented by the general formula below:

$$R^2O—P(OR^3)(OR^1)$$

In the formula, $R^2$, $R^3$ and $R^4$ are each hydrogen atom, alkyl group having 1 to 30 carbon atoms or aryl group having 6 to 30 carbon atoms, and at least one of $R^2$, $R^3$ and $R^4$ is aryl group having 6 to 30 carbon atoms.

Examples of organic phosphite compounds include triphenyl phosphite, tris(nonylphenyl) phosphite, dilauryl hydrogen phosphite, triethyl phosphite, tridecyl phosphite, tris(2-ethylhexyl) phosphite, tris(tridecyl) phosphite, tristearyl phosphite, diphenylmonodecyl phosphite, monophenyldidecyl phosphite, diphenylmono(tridecyl) phosphite, tetraphenyldipropylene glycol diphosphite, tetraphenyltetra(tridecyl)pentaerythritol tetraphosphite, hydrogenated bisphenol A phenyl phosphite polymers, diphenyl hydrogen phosphite, 4,4'-butylidene-bis(3-methyl-6-tert-butylphenyldi(tridecyl) phosphite), tetra(tridecyl) 4,4'-isopropylidene diphenyl diphosphite, bis(tridecyl) pentaerythritol diphosphite, bis(nonylphenyl)pentaerythritol diphosphite, dilaurylpentaerythritol diphosphite, distearylpentaerythritol diphosphite, tris(4-tert-butylphenyl) phosphite, tris(2,4-di-tert-butylphenyl) phosphite, hydrogenated bisphenol A pentaerythritol phosphite polymers, bis(2,4-di-tert-butylphenyl) pentaerythritol diphosphite, bis(2,6-di-tert-butyl-4-methylphenyl)pentaerythritol diphosphite, 2,2'-methylene-bis(4,6-di-tert-butylphenyl)octyl phosphite and bis(2,4-dicumylphenyl) pentaerythritol diphosphite. Of these, bis(2,6-di-tert-butyl-4-methylphenyl)pentaerythritol diphosphite is preferred.

A preferred organic phosphonite compound is a compound represented by the general formula below:

$$R^5—P(OR^6)(OR^7)$$

In the formula, $R^5$, $R^6$ and $R^7$ are each hydrogen atom, alkyl group having 1 to 30 carbon atoms or aryl group having 6 to 30 carbon atoms, and at least one of $R^5$, $R^6$ and $R^7$ is aryl group having 6 to 30 carbon atoms.

In addition, examples of organic phosphonite compounds include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite.

Any conventional well-known sulfur atom-containing compound can be used as the sulfur-containing stabilizer, and of these, a thioether compound is preferred. Specific examples thereof include didodecyl thiodipropionate, ditetradecyl thiodipropionate, dioctadecyl thiodipropionate, pentaerythritol tetrakis(3-dodecyl thiopropionate), thiobis(N-phenyl-β-naphthylamine), 2-mercaptobenzotriazole, 2-mercaptobenzimidazole, tetramethyl thiuram monosulfide, tetramethyl thiuram disulfide, nickel dibutyl dithiocarbamate, nickel isopropyl xanthate and trilauryl trithiophosphate. Of these, pentaerythritol tetrakis(3-dodecyl thiopropionate) is preferred.

Examples of phenol-containing stabilizers include pentaerythritol tetrakis(3-(3,5-di-t-butyl-4-hydroxyphenyl)propionate), octadecyl-3-(3,5-di-tert-butyl-4-hydroxyphenyl) propionate, thiodiethylene bis(3-(3,5-di-tert-butyl-4-hydroxyphenyl)propionate), and pentaerythritol tetrakis(3-(3,5-di-neopentyl-4-hydroxyphenyl)propionate). Of these, pentaerythritol tetrakis(3-(3,5-di-tert-butyl-4-hydroxyphenyl)propionate) and octadecyl-3-(3,5-di-tert-butyl-4-hydroxyphenyl)propionate are preferred.

It is possible to incorporate one stabilizer or an arbitrary combination of two or more types thereof combined at arbitrary proportions.

The content of the stabilizer is preferably 0.001 to 2 parts by mass relative to a total of 100 parts by mass of the PPS resin (A), the rubber-reinforced polystyrene or polystyrene (B) and the PPE resin (C). If the content of the stabilizer is less than 0.001 parts by mass, the thermal stability of the resin composition tends to decrease and a decrease in molecular weight and a deterioration in color tone tend to occur when the composition is molded, and if the content of the stabilizer exceeds 2 parts by mass, the quantity thereof becomes excessive, silvering occurs, and a deterioration in color tone readily occurs. The content of the stabilizer is more preferably 0.01 to 1.5 parts by mass, and further preferably 0.1 to 1 parts by mass.

[Mold-Release Agent]

In addition, the resin composition of the present invention preferably contains a mold-release agent (or a lubricant).

Examples of the mold-release agent (lubricant) include hydrocarbon-containing mold-release agents such as liquid paraffin, paraffin wax, polyethylene wax and polypropylene wax; fatty acid-containing mold-release agents such as stearyl alcohol, stearic acid and 12-hydroxystearic acid; amide-containing mold-release agents such as stearic acid amide, oleic acid amide, erucic acid amide, behenic acid amide, methylene bisstearic acid amide, ethylene stearic acid amide, ethylene bisoleic acid amide, ethylene biserucic acid amide and ethylene bislauric acid amide; metal soap-containing mold-release agents such as calcium stearate, zinc stearate, magnesium stearate, lead stearate, aluminum stearate and barium stearate; hydrogenated oils and fats; and ester-containing mold-release agents such as glycerin monostearate, butyl stearate, pentaerythritol stearate and stearyl stearate.

Of these, amide-containing mold-release agents are preferred from the perspectives of having a high softening point, increasing the fluidity and heat resistance of the resin composition and exhibiting a high mold-release effect, and of these, ethylene bisfatty acid amides, and especially methylene bisstearic acid amide, are preferred.

The content of the mold-release agent (lubricant) is preferably 0.1 to 3 parts by mass, more preferably 0.2 to 2.5 parts by mass, and further preferably 0.3 to 2 parts by mass, relative to a total of 100 parts by mass of the PPS resin (A), the rubber-reinforced polystyrene or polystyrene (B) and the PPE resin (C). If this content is less than 0.1 parts by mass, surface properties tend to deteriorate as a result of release defects during melt processing, but if this content exceeds 3 parts by mass, the kneading workability of the resin composition tends to deteriorate and the surface of a molded article tends to be cloudy.

[Carbon Black]

The resin composition of the present invention preferably contains carbon black.

The carbon black is not limited in terms of type, raw material or production method, and it is possible to use furnace black, channel black, acetylene black, ketjen black, or the like. The number average particle diameter of the carbon black is not particularly limited, but is preferably approximately 5 to 60 nm.

The carbon black is preferably used as a master batch formed in advance together with a thermoplastic resin. Preferred examples of the thermoplastic resin used for forming the master batch include PPS resin, PPE resin, olefinic resin and styrenic resin, with styrenic resin, and especially acrylonitrile-styrene resin (AS resin), being preferred.

The content of the carbon black is preferably 0.1 to 4 parts by mass, and more preferably 0.2 to 3 parts by mass, relative to a total of 100 parts by mass of the PPS resin (A), the rubber-reinforced polystyrene or polystyrene (B) and the PPE resin (C). If this content is 0.1 parts by mass or more, the advantageous effect of achieving a desired color is enhanced and a weathering resistance improvement effect, and so on, can be expected. If this content is 4 parts by mass or less, it is expected that a decrease in mechanical characteristics can be suppressed.

[Other Contained Components]

In addition to the PPS resin (A), the rubber-reinforced polystyrene or polystyrene (B) and the PPE resin (C) described above, the resin composition of the present invention can contain other thermoplastic resins as long as the advantageous effect of the present invention is not impaired. Specific examples of other thermoplastic resins include polybutylene terephthalate resin, polyacetal resin, polyamide resin, polycarbonate resin, polysulfone resin, polyethersulfone resin, polyetherimide resin, polyether ketone resin and polyolefin resin.

However, in cases where another type of resin is contained, the content thereof is preferably 20 parts by mass or less, more preferably 10 parts by mass or less, further preferably 5 parts by mass or less, and particularly preferably 3 parts by mass or less, relative to a total of 100 parts by mass of the PPS resin (A), the rubber-reinforced polystyrene or polystyrene (B) and the polyphenylene ether resin (C).

In addition, the resin composition of the present invention may contain a variety of additives in addition to those mentioned above, and examples of such additives include anti-dripping agent, ultraviolet radiation absorber, anti-static agent, anti-fogging agent, anti-blocking agent, plasticizer, dispersing agent, antimicrobial agent, and coloring agent, dye and pigment.

[Production of Resin Composition]

The resin composition of the present invention can be produced using a conventional method for preparing a resin composition. That is, the PPS resin (A), the rubber-reinforced polystyrene or polystyrene (B), the polyphenylene ether resin (C) and, optionally, other resin components and various additives, but not the fibrous filler (D), are thoroughly mixed all at once and then melt kneaded using a single screw or twin screw extruder. It is also possible to produce the resin composition by not pre-mixing the components or pre-mixing only some of the components, and then supplying to an extruder by means of a feeder and carrying out melt kneading. In addition, some of the components may be blended as a master batch and then melt kneaded. Furthermore, various molded bodies can be produced by supplying the mixture obtained by mixing the components in advance to a molding machine such as an injection molding machine without melt kneading the mixture. Moreover, the fibrous filler (D) is preferably introduced using a side feeder.

The heating temperature during melt kneading can generally be selected, as appropriate, within the range 280 to 350° C. If this temperature is too high, decomposition gas tends to be generated, and this can lead to appearance defects. Therefore, it is preferable to select a screw configuration that takes into account shear heat generation and so on. In order to suppress decomposition during kneading and during molding in a subsequent process, it is preferable to use an antioxidant or a thermal stabilizer.

[Molded Article]

The method for producing a molded article using the resin composition of the present invention is not particularly limited, and can be any molding method commonly used for resin compositions. Examples thereof include injection molding method, ultra-high-speed injection molding method, injection compression molding method, two-color molding method, blow molding method such as gas-assisted method, molding method that use heat insulating mold, molding method that use rapidly heated mold, foaming molding method (including supercritical fluid), insert molding method, IMC (in-mold coating) molding method, extrusion molding method, sheet molding method, thermoforming method, rotational molding method, lamination molding method, press molding method and blow molding method. Of these, injection molding and insert molding method are particularly preferred. In addition, in one embodiment of the present invention, the resin composition of the present invention is unlikely to corrode metal, and is therefore particularly suitable for insert molding.

An obtained molded article is excellent in terms of having a high degree of low warpage and heat resistance, and exhibits excellent toughness, strength, other mechanical characteristics and chemical resistance, and can therefore be used particularly advantageously in electrical/electronic equipment components, motor vehicle interior and exterior components, other electrical equipment components and mechanical components, for which there are strict requirements in terms of these characteristics. In addition, in one embodiment of the present invention, an obtained molded body is excellent in terms of low warpage, heat resistance and flame retardancy, exhibits excellent toughness, strength, other mechanical characteristics and chemical resistance, and is unlikely to corrode metals, and can therefore be used particularly advantageously in electrical/electronic equipment components, motor vehicle interior and exterior components, other electrical equipment components and mechanical components, for which there are strict requirements in terms of these characteristics.

Specific examples of electrical/electronic equipment components include connectors, coils, sensors, sensor covers, lamp sockets, resistors, relay cases, small switches, coil bobbins, capacitors, various terminal boards, plugs, PC housings, IH cooker housing components, grill handles, coil periphery components, protective frames for rice cookers, smart phone housings, industrial breaker housings, inverter cases, cell phone housings, heater housings, battery separators, battery cases and charging equipment for motor vehicle.

Particularly preferred examples of motor vehicle interior and exterior components include in-vehicle housing components, in-vehicle battery cases, in-vehicle battery covers, in-vehicle battery separators, various motor cases, sensor cases, various valves such as exhaust gas valves, various pipes for fuel systems, exhaust gas systems and induction systems, air intake nozzles, intake manifolds, fuel pumps, engine cooling water joints, carburetor main bodies, carburetor spacers, in-vehicle camera brackets, exhaust gas sensors, holder components, door mirror stays, housings for heads up displays inside motor vehicles, housings for engine control units (ECU), and connector components for motor vehicle electrical equipment.

The resin composition of the present invention is particularly suitable as in-vehicle housing component or the like.

EXAMPLES

The present invention will now be explained in greater detail through the use of examples. However, it should be understood that the present invention is not limited to the examples given below.

Examples 1 to 10 and Comparative Examples 1 to 7

Components used are as shown in Table 1 below.

TABLE 1

| Component | Sym. | |
|---|---|---|
| PPS Resin (A) | A1 | Linear polyphenylene sulfide MVR = 110 $cm^3$/10 min (295° C., 1.00 kgf) |
| | A2 | Linear polyphenylene sulfide MVR = 140 $cm^3$/10 min (295° C., 1.00 kgf) |
| | AX | Linear polyphenylene sulfide MVR = 15 $cm^3$/10 min (295° C., 1.00 kgf) |
| Polystyrene (B) | B1 | Amorphous polystyrene MVR = 1.3 $cm^3$/10 min (200° C., 5 kgf) |
| | BX | Amorphous polystyrene MVR = 20 $cm^3$/10 min (200° C., 5 kgf) |
| PPE resin (C) | C1 | Polyphenylene ether intrinsic viscosity = 0.47 dL/g (in chloroform at 30° C.) |
| | C2 | Polyphenylene ether intrinsic viscosity = 0.38 dL/g (in chloroform at 30° C.) |
| Fibrous filler (D) | D1 | Round glass fibers; fiber diameter = 10 um T-187H by Nippon Electric Glass Co. |
| Elastomer | G1 | Epoxy group-containing olefinic elastomer Lotader AX8900 by Arkema Group |
| Stabilizer | J1 | Hindered phenol antioxidant AO-60 by ADEKA |
| Mold-release agent | K1 | Ethylene bisstearamide mold-release agent Light Amide WH255 by Kyoeisha Chemical Co. |
| Talc | L1 | Micron White 5000S by Hayashi Kasei Co. average particle diameter D50 = 4 um |
| | L2 | LU-R produced by Nippon Talc Co. average particle diameter D50 = 36 um |
| Carbon black MB | M1 | Carbon black master batch acrylonitrile-styrene copolymer base; CB concentration = 50% |

Among the components shown in Table 1 above, components other than the fibrous filler (D) were homogeneously mixed at proportions shown in Tables 2 to 3 below (all proportions are in terms of parts by mass) using a tumbler mixer, and then melt kneaded using a twin screw extruder (a TEX30α produced by Japan Steel Works, Ltd.; L/D=42) at a preset cylinder temperature of 310° C., a discharge rate of 30 kg/h and a screw rotation speed of 200 rpm while introducing the fibrous filler (D) using a side feeder to obtain a resin composition, and the resin composition was rapidly cooled in a water bath, and pelletized using a pelletizer to obtain pellets of the resin composition.

[Tensile Breaking Strength and Tensile Breaking Elongation]

After drying the thus obtained pellets for 5 hours at 120° C., ISO multipurpose test pieces (having thicknesses of 4 mm) were injection molded using an injection molding machine produced by Japan Steel Works, Ltd. (mold clamping force 85 T) at a cylinder temperature of 320° C. and a mold temperature of 140° C.

Tensile breaking strength (units: MPa) and tensile breaking elongation (units: %) were measured in accordance with ISO 527 using the ISO multipurpose test piece (thickness 4 mm) described above.

[Maximum Flexural Strength and Flexural Modulus of Elasticity]

Maximum flexural strength (units: MPa) and flexural modulus of elasticity (units: MPa) were measured at 23° C. in accordance with ISO 178 using the ISO multipurpose test piece (thickness 4 mm) described above.

[Notched Charpy Impact Strength]

In accordance with ISO 179, a notched test piece was obtained by cutting notches in the ISO multipurpose test piece (thickness 4 mm) described above, and the Charpy impact strength (units: $kJ/m^2$) of the notched test piece was measured at a temperature 23° C.

[Assessment of Deflection Temperature Under Load and Heat Resistance]

Deflection temperature under load was measured using the ISO multipurpose test piece (thickness 4 mm) described above in accordance with ISO75-1 and ISO75-2 under a load of 1.80 MPa.

Heat resistance was assessed using the following criteria.

AA: deflection temperature under load of higher than 250° C.

A: deflection temperature under load of 150° C. to 250° C.

C: deflection temperature under load of lower than 150° C.

[Solder Heat Resistance Test and Solder Heat Resistance Assessment]

A combustion test piece measuring 12.5 mm×125 mm×1.5 mm thick was injection molded using an injection molding machine (a J50ADS produced by Japan Steel Works, Ltd.) at a cylinder temperature of 310° C. and a mold temperature of 130° C. Using tweezers, this test piece was immersed for 10 seconds in a solder bath adjusted to a temperature of 260° C. and then removed from the solder bath, and the state of the test piece was then observed.

Solder heat resistance was evaluated and assessed using the following criteria.

A: no anomalies were observed in terms of shape or appearance.

B: the shape of the test piece was maintained, but appearance anomalies such as swelling were observed.

C: the shape of the test piece was not maintained.

[Assessment of Warpage Amount and Warpage]

A circular disk having a diameter of 100 mm and a thickness of 1.6 mm was molded using a side gate mold in an injection molding machine (an NEX80 produced by Nissei Plastic Industrial Co., Ltd.) at a cylinder temperature of 260° C., a mold temperature of 80° C. and an injection time of 0.5 sec, and the warpage amount (units: mm) of the circular disk was determined.

Warpage was evaluated and assessed using the following criteria.

AA: warpage amount of not more than 3 mm

B: warpage amount of more than 3 mm but less than 4 mm

C: warpage amount at least 4 mm

The results of these evaluations are shown in Tables 2 to 3 below.

TABLE 2

| | | Example | | | | Comparative Example | |
|---|---|---|---|---|---|---|---|
| | Sym. | 1 | 2 | 3 | 4 | 1 | 2 |
| PPS Resin (A) | A1 | 45 | 45 | | | | 100 |
| | A2 | | | 40 | 45 | | |
| | AX | | | | | 45 | |
| Polystyrene (B) | B1 | 55 | 27 | 30 | 27.5 | 55 | |
| | BX | | | | | | |
| Polyphenylene | C1 | | 28 | 30 | 27.5 | | |
| ether (C) | C2 | | | | | | |
| Fibrous filler (D) | D1 | 44.78 | 44.78 | 44.78 | 48.39 | 44.78 | 44.78 |
| Elastomer | G1 | | | | 8.06 | | |
| Stabilizer | J1 | 0.45 | 0.45 | 0.45 | 0.48 | 0.45 | 0.45 |
| Mold-release agent | K1 | 0.75 | 0.75 | 0.75 | 0.81 | 0.75 | 0.75 |
| Talc | L1 | 0.30 | 0.30 | 0.30 | 0.32 | 0.30 | 0.30 |
| | L2 | | | | | | |
| CB-MB | M1 | 2.99 | 2.99 | 2.99 | 3.23 | 2.99 | 2.99 |
| (B)/(C) | | — | 1.0 | 1.0 | 1.0 | — | — |
| Tensile breaking strength [MPa] | | 118 | 119 | 113 | 123 | 96 | 137 |
| Tensile breaking elongation [%] | | 2 | 2 | 2 | 2 | 2 | 2 |
| Maximum flexural strength [MPa] | | 172 | 17 | 176 | 175 | 169 | 183 |
| Flexural modulus of elasticity [MPa] | | 11180 | 10780 | 10440 | 9400 | 10520 | 11750 |
| Notched Charpy impact strength [kJ/m$^2$] | | 9.8 | 8.9 | 9.6 | 10.3 | 8.5 | 7.7 |
| Solder heat resistance test | | A | A | A | A | B | A |
| Deflection temp. under load [° C.] | | 226 | 198 | 190 | 187 | 126 | >250 |
| Heat resistance assessment | | A | A | A | A | C | AA |
| Warpage amount [mm] | | 3 | 2 | 2 | 2 | 5 | 7 |
| Assessment of low warpage | | A | AA | AA | AA | C | C |

| | | Comparative Example | | | | |
|---|---|---|---|---|---|---|
| | Sym. | 3 | 4 | 5 | 6 | 7 |
| PPS Resin (A) | A1 | 40 | 60 | 20 | 45 | |
| | A2 | | | | | |
| | AX | | | | | 45 |
| Polystyrene (B) | B1 | | 40 | 40 | 27.5 | 27.5 |
| | BX | 30 | | | | |
| Polyphenylene | C1 | | | 40 | 27.5 | 27.5 |
| ether (C) | C2 | 30 | | | | |
| Fibrous filler (D) | D1 | 44.78 | 44.78 | 44.78 | | |
| Elastomer | G1 | | | | | |
| Stabilizer | J1 | 0.45 | 0.45 | 0.45 | 0.44 | 0.44 |
| Mold-release agent | K1 | 0.75 | 0.75 | 0.75 | 0.44 | 0.44 |
| Talc | L1 | 0.30 | 0.30 | 0.30 | | |
| | L2 | | | | 43.86 | 43.86 |
| CB-MB | M1 | 2.99 | 2.99 | 2.99 | 1.46 | 1.46 |
| (B)/(C) | | 1.0 | — | 1.0 | 1.0 | 1.0 |
| Tensile breaking strength [MPa] | | 100 | 123 | 85 | 46 | 54 |
| Tensile breaking elongation [%] | | 2 | 2 | 2 | 1 | 1 |
| Maximum flexural strength [MPa] | | 165 | 179 | 150 | 96 | 112 |
| Flexural modulus of elasticity [MPa] | | 10400 | 10881 | 9600 | 7110 | 7730 |
| Notched Charpy impact strength [kJ/m$^2$] | | 7.1 | 10.3 | 7.2 | 1.1 | 1.4 |

TABLE 2-continued

| | | | | | |
|---|---|---|---|---|---|
| Solder heat resistance test | B | B | B | B | B |
| Deflection temp. under load [° C.] | 130 | 239 | 115 | 139 | 139 |
| Heat resistance assessment | C | A | C | C | C |
| Warpage amount [mm] | 5 | 4 | 5 | <1 | <1 |
| Assessment of low warpage | C | C | C | AA | AA |

TABLE 3

| | | Example | | | | | |
|---|---|---|---|---|---|---|---|
| | Sym. | 5 | 6 | 7 | 8 | 9 | 10 |
| PPS Resin (A) | A1 | | | | | | |
| | A2 | 48 | 45 | 45 | 45 | 45 | 45 |
| | AX | | | | | | |
| Polystyrene (B) | B1 | 17 | 37 | 41 | 10 | 50 | |
| | BX | | | | | | |
| Polyphenylene ether (C) | C1 | 35 | 18 | 14 | 45 | 5 | 55 |
| | C2 | | | | | | |
| Fibrous filler (D) | D1 | 41 | 44 | 44 | 44 | 44 | 44 |
| Elastomer (E) | G1 | | | | | | |
| Stabilizer | J1 | 0.41 | 0.44 | 0.44 | 0.44 | 0.44 | 0.44 |
| Mold-release agent | K1 | 0.41 | 0.74 | 0.74 | 0.74 | 0.74 | 0.74 |
| Talc | L1 | 0.27 | 0.29 | 0.29 | 0.29 | 0.29 | 0.29 |
| | L2 | 2.75 | 2.95 | 2.95 | 2.95 | 2.95 | 2.95 |
| CB-MB | M1 | 2.75 | 2.95 | 2.95 | 2.95 | 2.95 | 2.95 |
| (B)/(C) | | 0.5 | 2 | 3 | 0.2 | 10 | — |
| Tensile breaking strength [MPa] | | 137 | 130 | 128 | 144 | 133 | 116 |
| Tensile breaking elongation [%] | | 2 | 1 | 1 | 2 | 2 | 2 |
| Maximum flexural strength [MPa] | | 187 | 174 | 187 | 200 | 196 | 177 |
| Flexural modulus of elasticity [MPa] | | 10790 | 10810 | 10770 | 10300 | 10880 | 10330 |
| Notched Charpy impact strength [kJ/m$^2$] | | 7.9 | 9.0 | 9.0 | 6.5 | 9.3 | 7.3 |
| Solder heat resistance test | | A | A | A | A | A | A |
| Deflection temp. under load [° C.] | | 190 | 203 | 211 | 190 | 207 | 177 |
| Heat resistance assessment | | A | A | A | A | A | B |
| Warpage amount [mm] | | 2 | 2 | 3 | 2 | 3 | 2 |
| Assessment of low warpage | | AA | AA | A | AA | A | AA |

Examples 11 to 15

Components used are as shown in Table 4 below.

TABLE 4

| Component | Sym. | |
|---|---|---|
| PPS Resin (A) | A1 | Linear polyphenylene sulfide MVR = 130 cm$^3$/10 min (295° C., 1.00 kgf) |
| Polystyrene resin (B) | B1 | Amorphous polystyrene MVR = 1.3 cm$^3$/10 min (200° C., 5 kgf) |
| PPE resin (C) | C1 | Polyphenylene ether intrinsic viscosity = 0.47 dL/g (in chloroform at 30° C.) |
| Fibrous filler (D) | D1 | Round glass fibers; fiber diameter = 10 um T-187H by Nippon Electric Glass Co. |
| Brominated flame retardant | E1 | Brominated phthalimide; BT-93W by Albemarle Corp. thermal decomposition initiation temp. = 454° C. |
| (E) | E2 | Pentabromobenzyl polyacrylate; FR-1025 by ICL thermal decomposition initiation temp. = 369° C. |
| | E3 | Tetrabromobisphenol A-epoxy adduct CXB-2000H by Woojin Korea thermal decomposition initiation temp. = 373° C. |
| Sb trioxide | G1 | Antimony trioxide master batch polystyrene base/$Sb_2O_3$ concentration = 80% |

TABLE 4-continued

| Component | Sym. | |
|---|---|---|
| Epoxy compound (F) | F1 | Novolac epoxy compound; Mw = 3300 epoxy equivalent weight = 208 g/eq YDCN704 by NIPPON STEEL Chemical & Material Co. |
| | F2 | Epoxy group-containing acrylic copolymer epoxy equivalent weight = 285 g/eq Mw = 6700; Joncryl ADR4468C produced by BASF |
| Stabilizer | J1 | Hindered phenol antioxidant AO-60 produced by ADEKA |
| Mold-releaseagent | K2 | Oxidized polyethylene mold-release agent Licowax PED522 by Clariant |
| Talc | L1 | Micron White 5000S by Hayashi Kasei Co. average particle diameter D50 = 4 um |
| Carbon black MB | M1 | Carbon black master batch acrylonitrile-styrene copolymer base; CB concentration = 50% |

Among the components shown in Table 4 above, components other than the fibrous filler (D) were homogeneously mixed at proportions shown in Table 5 below (all proportions are in terms of parts by mass) using a tumbler mixer, and then melt kneaded using a twin screw extruder (a TEX30α produced by Japan Steel Works, Ltd.; L/D=42) at a preset cylinder temperature of 310° C., a discharge rate of 30 kg/h and a screw rotation speed of 200 rpm while introducing the fibrous filler (D) using a side feeder to obtain a resin composition, and the resin composition was rapidly cooled in a water bath, and pelletized using a pelletizer to obtain pellets of the resin composition.

[Tensile Breaking Strength and Tensile Breaking Elongation]

After drying the thus obtained pellets for 5 hours at 120° C., ISO multipurpose test pieces (having thicknesses of 4 mm) were injection molded using an injection molding machine produced by Japan Steel Works, Ltd. (mold clamping force 85 T) at a cylinder temperature of 320° C. and a mold temperature of 140° C.

Tensile breaking strength (units: MPa) and tensile breaking elongation (units: %) were measured in accordance with ISO 527 using the ISO multipurpose test piece (thickness 4 mm) described above.

[Maximum Flexural Strength and Flexural Modulus of Elasticity]

Maximum flexural strength (units: MPa) and flexural modulus of elasticity (units: MPa) were measured at 23° C. in accordance with ISO 178 using the ISO multipurpose test piece (thickness 4 mm) described above.

[Notched Charpy Impact Strength]

In accordance with ISO 179, a notched test piece was obtained by cutting notches in the ISO multipurpose test piece (thickness 4 mm) described above, and the Charpy impact strength (units: $KJ/m^2$) of the notched test piece was measured at a temperature 23° C.

[Assessment of Deflection Temperature Under Load and Heat Resistance]

Deflection temperature under load was measured using the ISO multipurpose test piece (thickness 4 mm) described above in accordance with ISO75-1 and ISO75-2 under a load of 1.80 MPa.

Heat resistance was assessed using the following criteria.

A: deflection temperature under load of not lower than 175° C.

C: deflection temperature under load of lower than 175° C.

[Solder Heat Resistance Test and Solder Heat Resistance Assessment]

A combustion test piece measuring 12.5 mm×125 mm×1.5 mm thick was injection molded using an injection molding machine (a J50ADS produced by Japan Steel Works, Ltd.) at a cylinder temperature of 310° C. and a mold temperature of 130° C. Using tweezers, this test piece was immersed for 10 seconds in a solder bath adjusted to a temperature of 260° C. and then removed from the solder bath, and the state of the test piece was then observed.

Solder heat resistance was evaluated and assessed using the following criteria.

A: no anomalies were observed in terms of shape or appearance.

B: the shape of the test piece was maintained, but appearance anomalies such as swelling were observed.

C: the shape of the test piece was not maintained.

[Flame Retardancy Evaluation (UL-94)]

In accordance with the Underwriters Laboratories Subject 94 (UL-94) method, combustibility (flame retardancy) was tested using five test pieces (thickness 1.6 mm).

Flame retardancy was classified as V-0, V-1, V-2 or non-conforming in accordance with an evaluation method described in UL-94.

[Assessment of Warpage Amount and Warpage]

A circular disk having a diameter of 100 mm and a thickness of 1.6 mm was molded using a side gate mold in an injection molding machine (an NEX80 produced by Nissei Plastic Industrial Co., Ltd.) at a cylinder temperature of 310° C., a mold temperature of 130° C. and an injection time of 0.5 sec, and the warpage amount (units: mm) of the circular disk was determined.

Warpage was evaluated and assessed using the following criteria.

A: warpage amount of not more than 3 mm

B: warpage amount of more than 3 mm but not more than 5 mm

C: warpage amount of more than 5 mm

[Corrosivity Evaluation]

4 g of obtained resin composition pellets were placed in a glass test tube having an internal diameter of 170 and a height of 160 mm. The test tube was sealed with a 27φ glass sheet having a silver plate (10 mm×10 mm×0.2 mmt) bonded to the inside thereof, held for 2 hours with a block heater held at 350° C., and the degree of change in the color of the silver plate was evaluated using the criteria shown below by determining the a* value and b* value on the basis of the SCI method using a photometer color difference meter (a CM-3600d produced by Konica Minolta, Inc.).

A: the value of a*+b* is less than 10.0

$B^+$: the value of a*+b*+ is at least 10.0 but less than 15.0

B: the value of a*+b* is at least 15.0 but less than 20.0

C: the value of a*+b* is at least 20.0

The results of these evaluations are shown in Table 5 below.

TABLE 5

| | Sym. | Example 11 | Example 12 | Example 13 | Example 14 | Example 15 |
|---|---|---|---|---|---|---|
| PPS Resin (A) | A1 | 45.0 | 45.0 | 45.0 | 45.0 | 45.0 |
| Polystyrene resin (B) | B1 | 27.5 | 27.5 | 27.5 | 27.5 | 27.5 |
| PPE resin (C) | C1 | 27.5 | 27.5 | 27.5 | 27.5 | 27.5 |
| Fibrous filler (D) | D1 | 48.3 | 75.5 | 64.5 | 48.2 | 49.0 |
| Brominated flame | E1 | 6.29 | 6.23 | 5.32 | | |
| retardant (E) | E2 | | | | 5.96 | |
| | E3 | | | | | 7.76 |
| Sb trioxide | G1 | 3.63 | 3.58 | 3.06 | 3.62 | 3.68 |
| Epoxy compound (F) | F1 | | | 0.81 | | |
| Stabilizer | J1 | 0.48 | 0.57 | 0.48 | 0.48 | 0.49 |
| Mold-release agent | K2 | 0.48 | 0.57 | 0.48 | 0.48 | 0.49 |
| Talc | L1 | 0.32 | 0.38 | 0.32 | 0.32 | 0.33 |
| CB-MB | M1 | 1.61 | 1.89 | 1.61 | 1.61 | 1.63 |
| MVR [$cm^3$/10 min] | | 51.6 | 51.9 | 51.6 | 48.2 | 53.2 |
| (B)/(C) | | 1.0 | 1.0 | 1.0 | 1.0 | 1.0 |
| Tensile breaking strength [MPa] | | 124 | 120 | 129 | 125 | 112 |
| Tensile breaking elongation [%] | | 2 | 1 | 2 | 2 | 1 |
| Maximum flexural strength [MPa] | | 170 | 179 | 193 | 172 | 165 |
| Flexural modulus of elasticity [MPa] | | 11330 | 14700 | 14900 | 10990 | 10960 |

TABLE 5-continued

| | Example | | | | |
|---|---|---|---|---|---|
| Sym. | 11 | 12 | 13 | 14 | 15 |
| Notched Charpy impact strength [kJ/m$^2$] | 7.7 | 7.3 | 8.2 | 8.6 | 7.8 |
| Solder heat resistance test | A | A | A | A | A |
| Deflection temperature under load [° C.] | 196 | 216 | 209 | 186 | 181 |
| Heat resistance assessment | A | A | A | A | A |
| Flame retardancy | V-0 | V-0 | V-0 | V-0 | V-0 |
| Warpage amount [mm] | 2 | 1 | 1 | 2 | 2 |
| Assessment of low warpage | A | A | A | A | A |
| Assessment of corrosivity | A | A | A | B+ | B |

Examples 16 to 19

Among the components shown in Table 4 above, components other than the fibrous filler (D) were homogeneously mixed at proportions shown in Table 6 below (all proportions are in terms of parts by mass) using a tumbler mixer, and then melt kneaded using a twin screw extruder (a TEX30α produced by Japan Steel Works, Ltd.; L/D=42) at a preset cylinder temperature of 310° C., a discharge rate of 30 kg/h and a screw rotation speed of 200 rpm while introducing the fibrous filler (D) using a side feeder to obtain a resin composition, and the resin composition was rapidly cooled in a water bath, and pelletized using a pelletizer to obtain pellets of the resin composition.

[Tensile Breaking Strength and Tensile Breaking Elongation]

Tensile breaking strength (units: MPa) and tensile breaking elongation (units: %) were measured in the same way as described above.

[Maximum Flexural Strength and Flexural Modulus of Elasticity]

Maximum flexural strength (units: MPa) and flexural modulus of elasticity (units: MPa) were measured at 23° C. in the same way as described above.

[Assessment of Mechanical Strength]

Mechanical strength was evaluated and assessed using the results above and the criteria shown below.

A: a tensile strength of at least 130 MPa and a flexural strength of at least 175 MPa B: a tensile strength of at least 120 MPa and a flexural strength of at least 170 MPa C: conditions A and B not satisfied

[Assessment of Deflection Temperature Under Load and Heat Resistance]

Deflection temperature under load was measured in the same way as described above.

Heat resistance was assessed using the following criteria.

A: deflection temperature under load of not lower than 175° C.

C: deflection temperature under load of lower than 175° C.

[Solder Heat Resistance Test and Solder Heat Resistance Assessment]

The state of the test piece was observed in the same way as described above.

Solder heat resistance was evaluated and assessed using the following criteria.

A: no anomalies were observed in terms of shape or appearance.

B: the shape of the test piece was maintained, but appearance anomalies such as swelling were observed.

C: the shape of the test piece was not maintained.

[Assessment of Warpage Amount and Warpage]

The warpage amount (units: mm) of the circular disk was measured in the same way as described above.

Warpage was evaluated and assessed using the following criteria.

A: warpage amount of less than 3 mm

B: warpage amount of at least 3 mm but less than 5 mm

C: warpage amount of at least 5 mm

The results of these evaluations are shown in Table 6 below.

TABLE 6

| | | Example | | | |
|---|---|---|---|---|---|
| | Sym. | 16 | 17 | 18 | 19 |
| PPS Resin (A) | A1 | 45.0 | 45.0 | 45.0 | 45.0 |
| Polystyrene resin (B) | B1 | 27.5 | 27.5 | 27.5 | 27.5 |
| PPE resin (C) | C1 | 27.5 | 27.5 | 27.5 | 27.5 |
| Fibrous filler (D) | D1 | 44.2 | 44.3 | 58.9 | 44.3 |
| Epoxy compound (F) | F1 | 0.37 | 0.74 | 0.74 | |
| | F2 | | | | 0.74 |
| Stabilizer | J1 | 0.44 | 0.44 | 0.44 | 0.44 |
| Mold-release agent | K2 | 0.44 | 0.44 | 0.44 | 0.44 |
| Talc | L1 | 0.29 | 0.30 | 0.29 | 0.30 |
| CB-MB | M1 | 1.47 | 1.48 | 1.47 | 1.48 |
| (B)/(C) | | 1.0 | 1.0 | 1.0 | 1.0 |
| Tensile breaking strength [MPa] | | 133 | 132 | 132 | 135 |
| Tensile breaking elongation [%] | | 1 | 1 | 1 | 1 |
| Maxim um flexural strength [MPa] | | 179 | 183 | 195 | 185 |
| Flexural modulus of elasticity [MPa] | | 10310 | 10310 | 14250 | 10330 |
| Assessment of mechanical strength | | A | A | A | A |
| Solder heat resistance test | | A | A | A | A |
| Deflection temperature under load [° C.] | | 190 | 188 | 213 | 187 |
| Heat resistance assessment | | A | A | A | A |

TABLE 6-continued

| Sym. | Example 16 | 17 | 18 | 19 |
|---|---|---|---|---|
| Warpage amount [mm] | 2 | 2 | 1 | 1 |
| Assessment of low warpage | A | A | A | A |

INDUSTRIAL APPLICABILITY

The resin composition of the present invention is excellent in terms of low warpage and heat resistance, and also exhibits excellent mechanical strength and chemical resistance, and can therefore be advantageously used in electrical/electronic equipment components, in-vehicle electrical equipment components, in-vehicle housing components, and the like, for which there are strict requirements in terms of these characteristics.

The invention claimed is:

1. A resin composition, comprising, based on 100 parts of total (A) to (C) mass by mass:

(A) a polyphenylene sulfide resin (A) having an MVR, measured at 295° C. under a 1.00 kgf load, in a range of from 60 to 500 $cm^3$/10 min, in a range of from 25 to 48 parts by mass;

(B) an amorphous rubber-reinforced polystyrene or polystyrene having an MVR, measured at 200° C. under a 5 kgf load, in a range of from 0.3 to 16 $cm^3$/10 min and/or (C) a polyphenylene ether resin, a total content of the amorphous rubber-reinforced polystyrene or polystyrene (B) and the polyphenylene ether resin (C) being in a range of from 52 to 75 parts by mass; and (D) of a fibrous filler in a range of from 5 to 150 parts by mass.

2. The resin composition of claim 1, comprising both of the amorphous rubber-reinforced polystyrene or polystyrene (B) and the polyphenylene ether resin (C), wherein the amorphous rubber-reinforced polystyrene or polystyrene (B) and the polyphenylene ether resin (C) are present in the resin composition in a range of from 52 to 75 parts by mass, based on 100 parts of the total (A) to (C) mass.

3. The resin composition of claim 1, wherein a (B)/(C) mass ratio of content values of the amorphous rubber-reinforced polystyrene or polystyrene (B) and the polyphenylene ether resin (C) is 0.1 or more.

4. The resin composition of claim 1, wherein a (B)/(C) mass ratio of content values of the amorphous rubber-reinforced polystyrene or polystyrene (B) and the polyphenylene ether resin (C) is 0.5 or more.

5. The resin composition of claim 1, further comprising:

(E) a brominated flame retardant in a range of from 1 to 20 parts by mass.

6. The resin composition of claim 1, further comprising:

(F) an epoxy compound in a range of from 0.1 to 5 parts by mass, wherein the epoxy compound (F) has a epoxy equivalent weight in a range of from 150 to 1500 g/eq.

7. The resin composition of claim 1, wherein the polyphenylene ether resin (C) has a an intrinsic viscosity, measured at 30° C. in chloroform, of 0.4 dl/g or more.

8. The resin composition of claim 1, wherein the polyphenylene sulfide resin (A) is a linear polyphenylene sulfide resin.

9. The resin composition of claim 1, wherein the fibrous filler (D) is surrounded by the polyphenylene sulfide resin (A).

10. A molded article, comprising:

the resin composition of claim 1.

11. The molded article of claim 10, which is an in-vehicle housing component.

* * * * *